US 8,794,670 B2

(12) United States Patent
Fuegel

(10) Patent No.: US 8,794,670 B2
(45) Date of Patent: Aug. 5, 2014

(54) MOBILE WORK APPLIANCE WITH A SUPPORTING STRUCTURE

(75) Inventor: Dietmar Fuegel, Wolfschlugen (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 13/701,148

(22) PCT Filed: Oct. 17, 2011

(86) PCT No.: PCT/EP2011/068068
§ 371 (c)(1),
(2), (4) Date: Nov. 30, 2012

(87) PCT Pub. No.: WO2012/065795
PCT Pub. Date: May 24, 2012

(65) Prior Publication Data
US 2013/0069353 A1    Mar. 21, 2013

(30) Foreign Application Priority Data

Nov. 16, 2010  (DE) .......................... 10 2010 043 957

(51) Int. Cl.
*B60S 9/10* (2006.01)
(52) U.S. Cl.
USPC ...................................... 280/763.1
(58) Field of Classification Search
USPC ............................ 280/762–766.1
See application file for complete search history.

(56) References Cited

U.S. PATENT DOCUMENTS 2,797,826 A    7/1957  Kuhlenschmidt et al.
6,276,718 B1   8/2001  Wolfram et al.

7,784,354 B2   8/2010  Gelies
8,087,695 B2   1/2012  Fügel et al.
2006/0043718 A1* 3/2006 Mayer ........................ 280/763.1

FOREIGN PATENT DOCUMENTS

| DE | 1 000 981 | 1/1957 |
| DE | 11 64 056 | 2/1964 |
| DE | 197 36 108 | 2/1999 |
| DE | 10 2006 006978 | 8/2007 |
| GB | 865 102 | 4/1961 |
| WO | WO 2005/042319 | 5/2005 |

OTHER PUBLICATIONS

German Search Report dated Sep. 19, 2011 in German Patent Application No. 10 2010 043 957.6 with English translation of relevant parts.
International Search Report of PCT/EP2011/068068, date of mailing Jan. 23, 2012.

* cited by examiner

*Primary Examiner* — Jeffrey J Restifo
*Assistant Examiner* — Erez Gurari
(74) *Attorney, Agent, or Firm* — Collard & Roe, P.C.

(57) ABSTRACT

The invention relates to a mobile work device, particularly a mobile concrete pump. The work device comprises essentially a chassis (12), two front and two rear support booms (38, 40) that can be moved out from a transport position into at least one working position relative to the chassis (12) and have a support leg (42) that can be supported on a substratum, in each instance, raising the chassis, as well as a drive unit (47) for controlling work assemblies and/or the support booms. A particular feature of the invention consists in that at least one of the support booms (40) having a beam profile or hollow-chamber profile has a transverse perforation (48) that can be configured as a housing for an ancillary assembly (52) of the drive unit, for example.

4 Claims, 5 Drawing Sheets

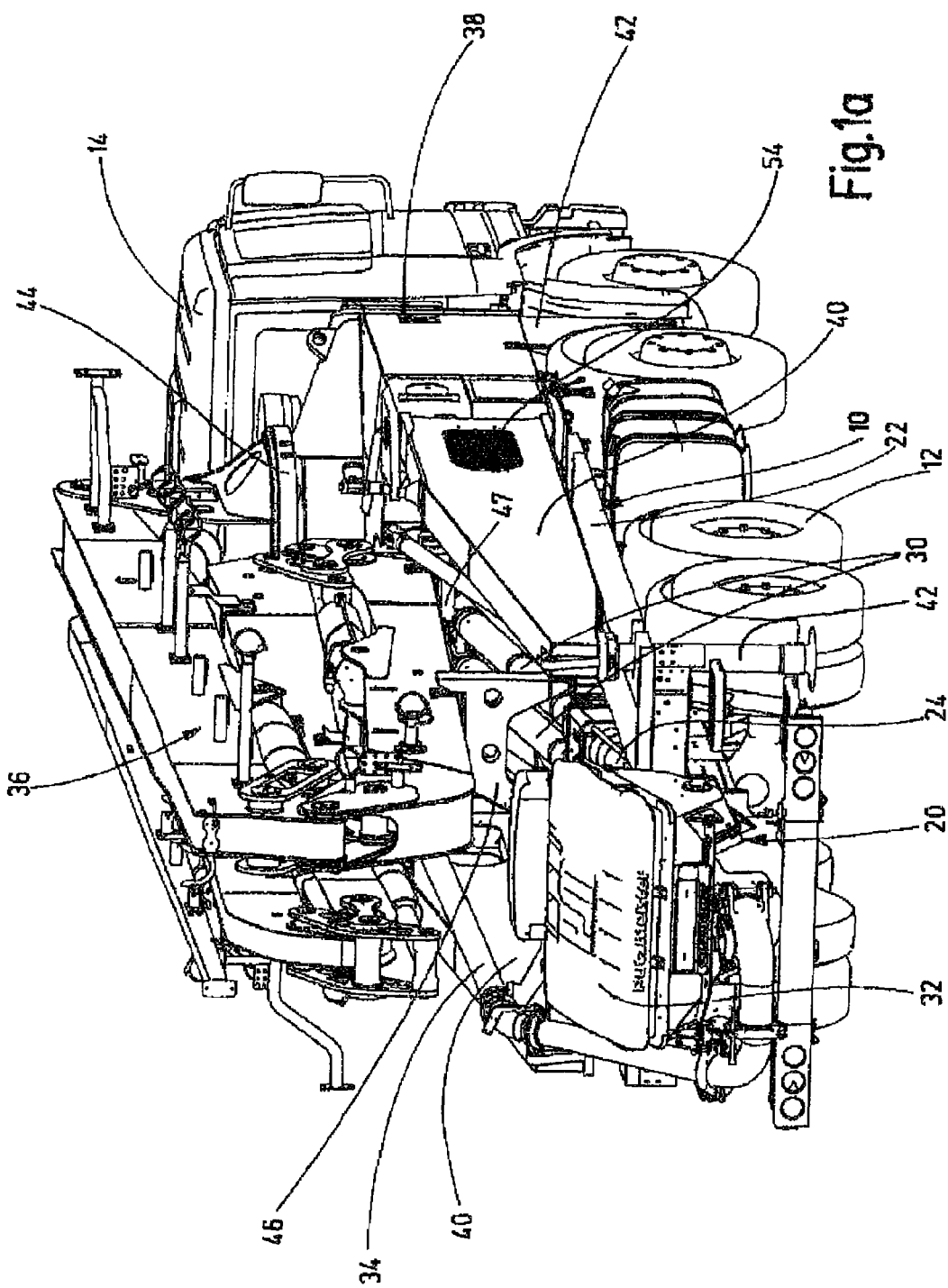

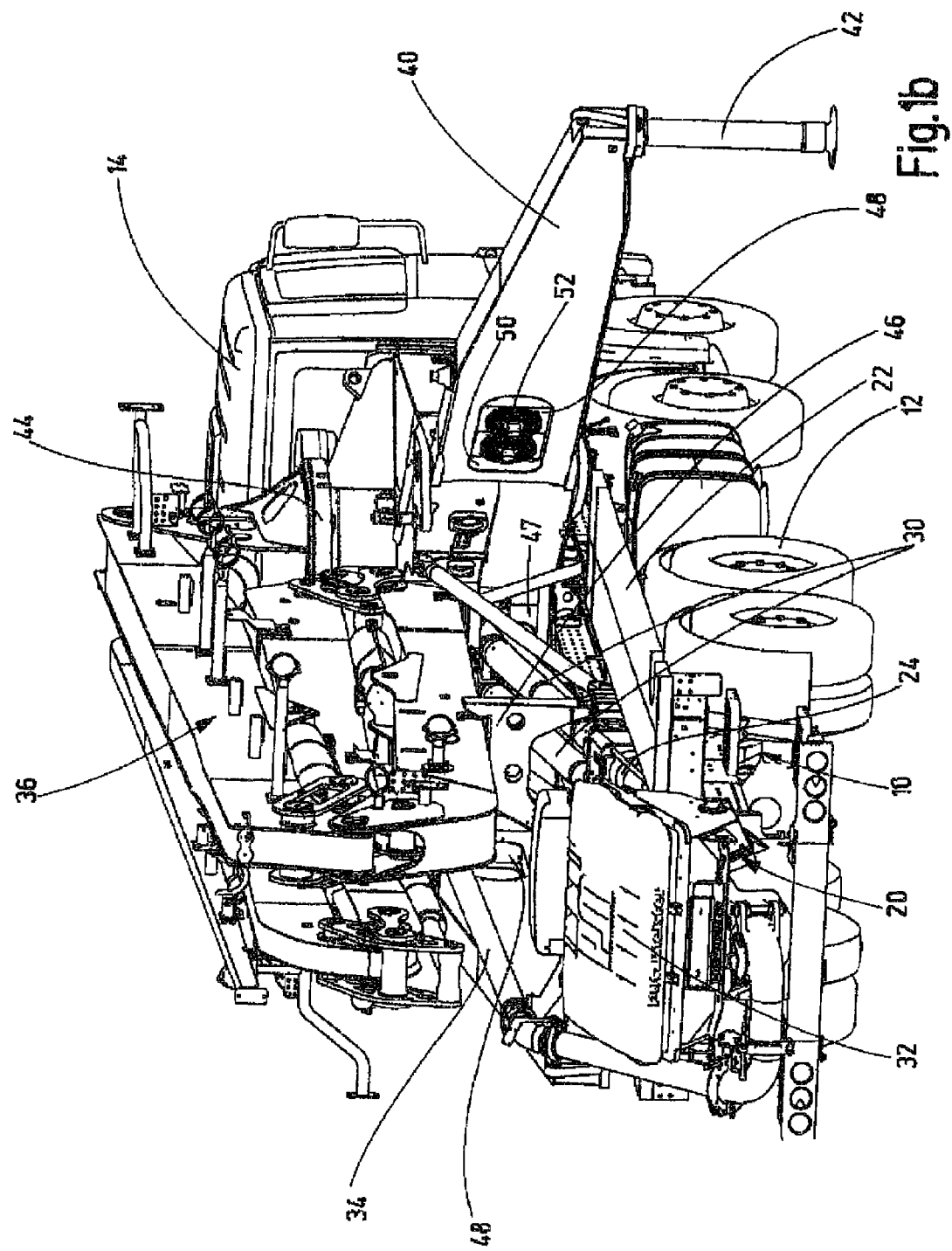

MOBILE WORK APPLIANCE WITH A SUPPORTING STRUCTURE

CROSS REFERENCE TO RELATED APPLICATIONS

Figure 2:
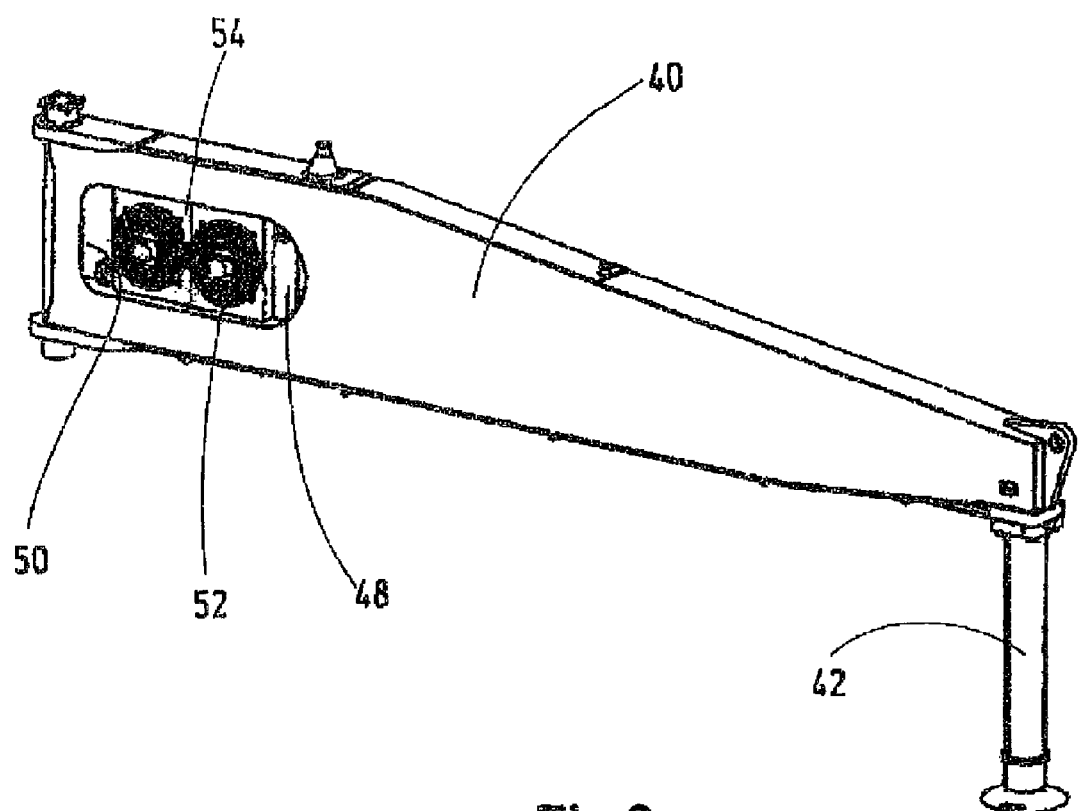

This application is the National Stage of PCT/EP2011/068068 filed on Oct. 17, 2011, which claims priority under 35 U.S.C. §119 of German Application No. 10 2010 043 957.6 filed on Nov. 16, 2010, the disclosure of which is incorporated by reference. The international application under PCT article 21(2) was not published in English.

The invention relates to a mobile work device, particularly a mobile concrete pump, having a chassis, having two front and two rear support booms that can be moved out from a transport position into at least one working position relative to the chassis and have a support leg that can be supported on a substratum, in each instance, raising the chassis, and having a drive unit for controlling work assemblies and/or the support booms.

In the case of mobile concrete pumps, the work assemblies comprise, among other things, a mast block having a distributor mast, as well as a core pump with a material application container. The core pump opens into a feed line, which is guided by way of the distributor mast. Depending on the pump model, the drive unit comprises one or more hydraulic pumps, as well as other ancillary pumps, for example for drive of the stirrer mechanism in the material application container of the core pump. The support booms primarily have the task of supporting the work device in its work position, on the substratum, in all positions of the work assemblies, in reliable and non-tipping manner. Accordingly, the demands on the strength of the support booms are relatively great. For their production, solid beam profiles or hollow-chamber profiles made of steel are usually used. On the other hand, the support booms take up a lot of space on the chassis, at the expense of the effective loading surface.

Proceeding from this, the invention is based on the task of configuring at least a part of the support booms to be lighter, while maintaining their strength and stability, and of structuring them with a space-saving additional benefit.

To accomplish this task, the combination of characteristics in accordance with the invention is proposed. Advantageous embodiments and further developments of the invention are discussed below.

The solution according to the invention proceeds from the idea that at least one of the support booms having a beam profile or hollow chamber profile can be provided with a transverse perforation. It has proven to be particularly advantageous if at least one transverse perforation is disposed in each of the rear support booms. A material saving is achieved by means of the transverse perforation, for one thing. For another, the transverse perforation has a reinforcement function in the support boom, with its perforation walls.

An advantageous embodiment of the invention provides that at least one transverse perforation is configured as a housing that is open on one or both sides and can be closed off by means of a cover, if necessary. An ancillary assembly of the drive unit can be disposed on the housing, for example. The ancillary assembly is preferably configured as a hydraulic cooler of the drive unit, which is predominantly activated hydraulically. It can be connected with a central control fixed in place on the chassis or with the drive unit by way of hydraulic lines, hydraulic hoses and/or electrical cables. Another additional benefit can be achieved in that at least one of the support booms configured as a hollow-chamber profile and having a transverse perforation has a liquid tank formed by the hollow chamber.

According to another preferred embodiment of the invention, the support booms, which are in part provided with transverse perforations, and the work assemblies are disposed on a superstructure frame fixed in place on the chassis.

Figure 3:
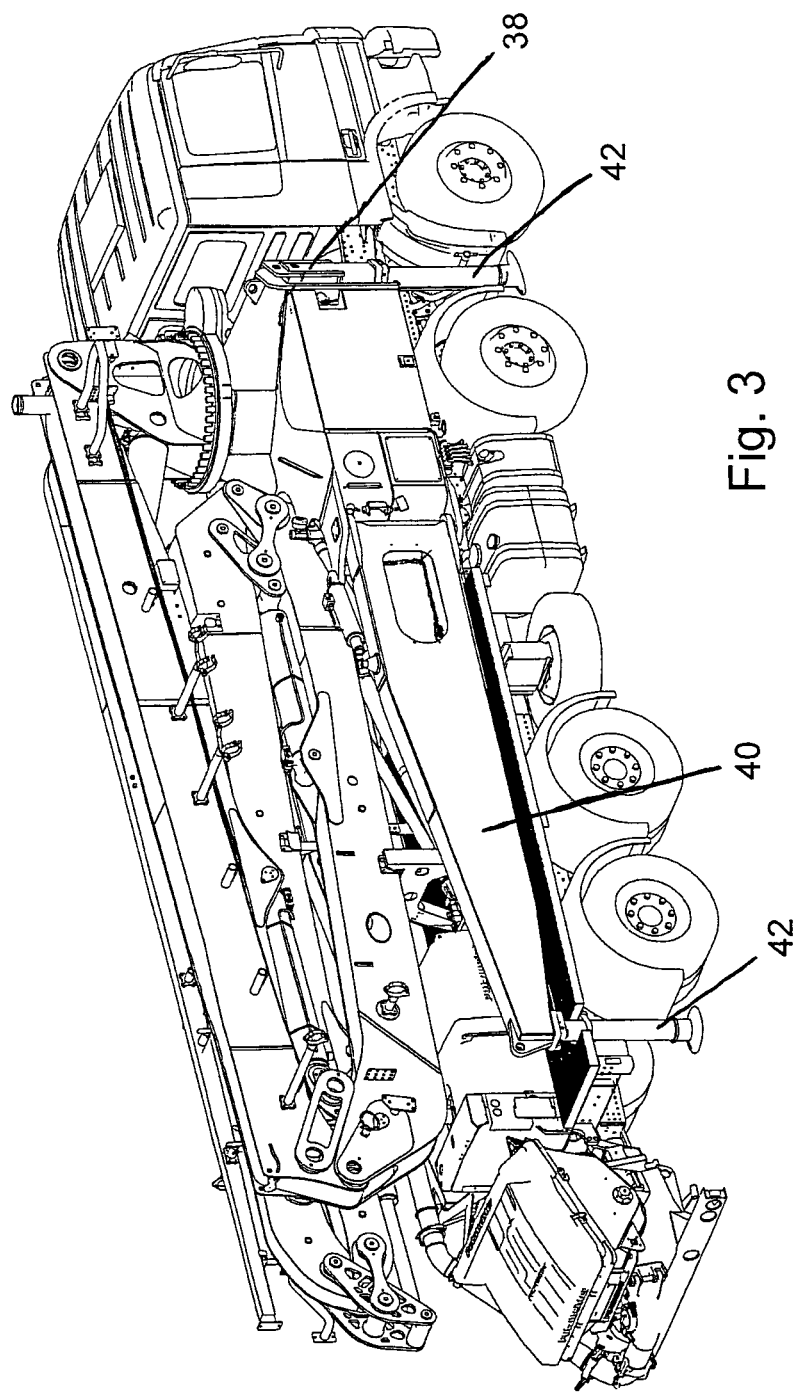
Figure 4:
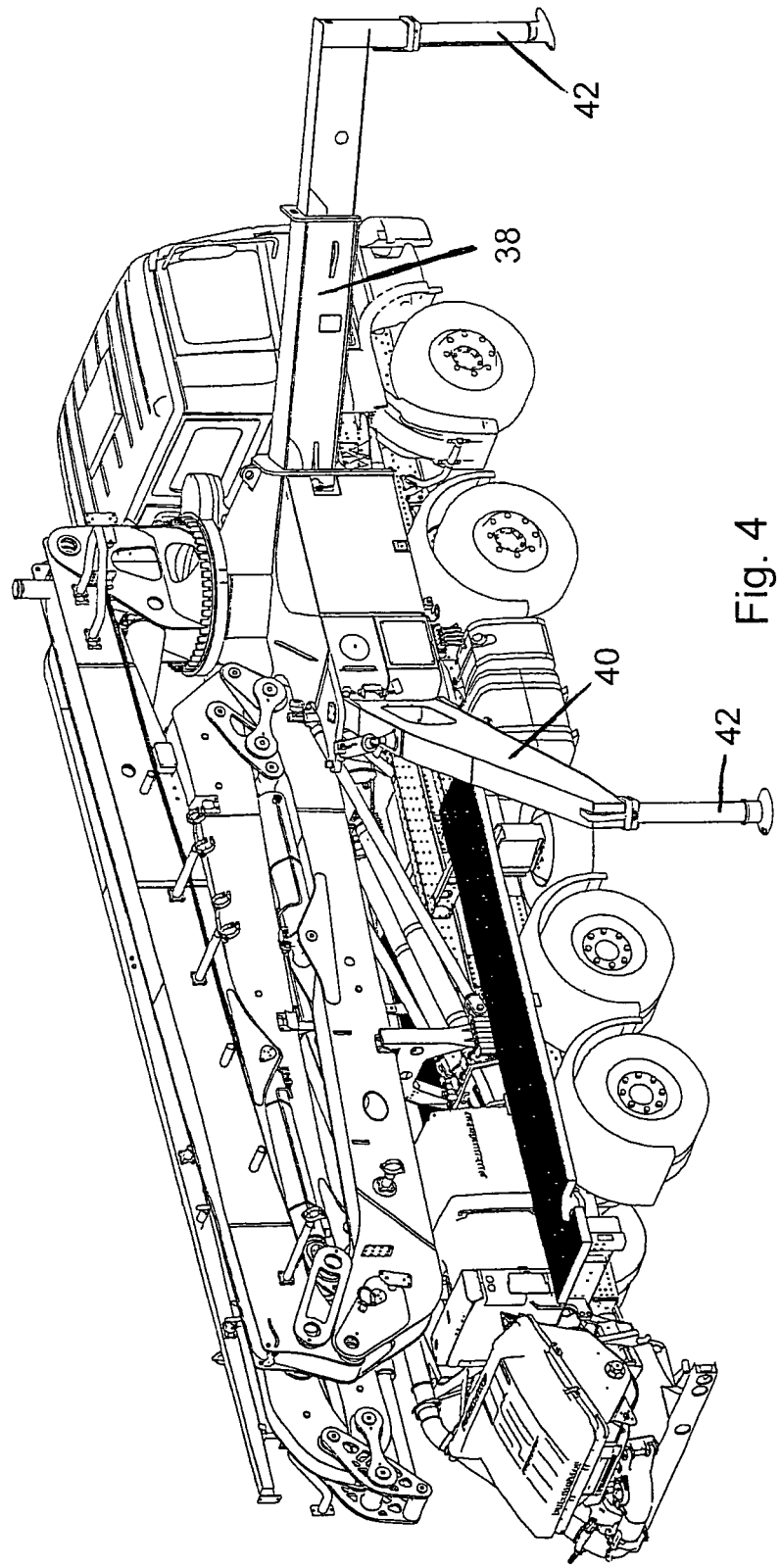

In the following, the invention will be explained in greater detail using an exemplary embodiment shown schematically in the drawing. This shows:

FIGS. 1a and b, a diagrammatic representation of a mobile concrete pump, with a retracted and an extended rear support boom;

FIG. 2 a diagrammatic side view of the rear support boom with an ancillary assembly built into a transverse perforation;

FIG. 3 a view of the mobile concrete pump showing a retracted front support boom and a retracted rear support boom; and FIG. 4 a view of the mobile concrete pump showing an extended front support boom and an extended rear support boom.

The mobile concrete pump shown in FIGS. 1a and b has a truck chassis 10 with a motor-driven chassis 12 and a driver's cabin 14. The chassis 10 carries a concrete pump 20 that is connected with the chassis 12 by way of a superstructure frame 22. The concrete pump superstructure comprises essentially a core pump 24 having two hydraulically driven conveying cylinders 30 and a material application container 32 rigidly disposed at the free end of the conveying cylinders 30. Furthermore, the superstructure comprises a pressurized conveying line 34 that is guided by way of a distributor mast 36 configured as a bending mast. The distributor mast 36 is mounted to rotate about a vertical axis, on a rotating mast bearing block 44 rigidly connected with the superstructure frame 22 in the vicinity of the driver's cabin 14. At the rear end of the superstructure frame 22, a mast boom 46 is disposed, on which the distributor mast 36 rests in the retracted travel state shown. Furthermore, a support apparatus with extendable front and rear support booms 38, 40 is provided. During concrete delivery operation, the support booms are extended in the sense of FIG. 1b, and supported on the ground with their telescoping support legs 42, raising the chassis 12. FIG. 3 shows a view of the front support boom 38 and the rear support boom 40 in a retracted state. FIG. 4 shows a view of the front support boom 38 and the rear support boom 40 in an extended state in which their respective telescoping support leg 42 extends to the ground for supporting the concrete pump. The hydraulic drive of the core pump 24, the distributor mast 36, and the support booms 38, 40 takes place by way of a drive unit 47, essentially consisting of hydraulic pumps that can be driven by way of a drive train that comes from the vehicle engine.

A particular feature of the invention consists in that the two rear support booms 40 are configured as hollow-chamber profile parts, which have a transverse perforation 48 in their front region, having a circumferential perforation wall 50. In this connection, the transverse perforation 48 has not only a weight-reducing function but also a reinforcing function. In the right rear support boom 40, the transverse perforation 48 forms a housing, in which an ancillary assembly 52 is disposed, which is connected with the drive unit 47 by way of hydraulic lines, hydraulic hoses and/or electrical cables, for example. The ancillary assembly 52 is configured as a hydraulic cooler, for example. In the exemplary embodiment shown, the transverse perforation 48 that contains the hydraulic cooler is open on one side, toward the inside, and closed off by a cover 54 on the outside. Fundamentally, one of the transverse perforations 48 can also be used as stowage space, for example for accommodating tool boxes, couplings, two by fours, or the like.

In summary, the following should be stated: The invention relates to a mobile work device, particularly a mobile concrete pump. The work device comprises essentially a chassis 12, two front and two rear support booms 38, 40 that can be moved out from a transport position into at least one working position relative to the chassis 12 and have a support leg 42 that can be supported on a substratum, in each instance, raising the chassis, as well as a drive unit 47 for controlling work assemblies and/or the support booms. A particular feature of the invention consists in that at least one of the support booms 40 having a beam profile or hollow-chamber profile has a transverse perforation 48 that can be configured as a housing for an ancillary assembly 52 of the drive unit, for example.

REFERENCE SYMBOL LIST

10 chassis
12 chassis
14 driver's cabin
20 concrete pump
22 superstructure frame
24 core pump
30 conveying cylinder
32 material application container
34 pressure conveying line
36 distributor mast
38, 40 support boom(s)
42 support leg
44 mast rotation bearing block
46 mast support block
47 drive unit
48 transverse perforation
50 perforation walls
52 ancillary assembly
54 cover

The invention claimed is:

1. Mobile work device, particularly a mobile concrete pump, having a chassis, having at least one front support boom and at least one rear support boom that can be moved out from a transport position into at least one working position relative to the chassis and that have a support leg that can be supported on a substratum, in each instance, raising the chassis, and having a drive unit for controlling work assemblies and/or the support booms, wherein the at least one rear support boom has a beam profile or hollow-chamber profile and has a transverse perforation,
  wherein the transverse perforation is configured as a housing that can be closed off via a cover,
  wherein the transverse perforation is configured as a housing for an ancillary assembly of the drive unit, and
  wherein the ancillary assembly is configured as a hydraulic cooler.

2. Work device according to claim 1, wherein the transverse perforation is configured as a reinforcement device, with its perforation walls.

3. Work device according to claim 1, wherein the ancillary assembly is connected with a central control fixed in place on the chassis or with the drive unit by way of hydraulic lines, hydraulic hoses and/or electrical cables.

4. Work device according to claim 1, wherein the at least one front support boom and the at least one rear support boom and work assemblies are disposed on a superstructure frame fixed in place on the chassis.

* * * * *